United States Patent [19]

Kanai

[11] 3,845,503

[45] Oct. 29, 1974

[54] FLUX SCANNING TRANSDUCER HAVING ANISOTROPIC SOFT MAGNETIC INNER POLE PIECE

[75] Inventor: Kenji Kanai, Higashi-Osaka, Japan

[73] Assignee: Matsushita Electric Industrial Co., Ltd., Kadoma City, Osaka Prefecture, Japan

[22] Filed: Dec. 4, 1972

[21] Appl. No.: 312,213

[30] Foreign Application Priority Data

| | | |
|---|---|---|
| Dec. 14, 1971 | Japan | 46-101590 |
| Dec. 14, 1971 | Japan | 46-101591 |
| Dec. 14, 1971 | Japan | 46-101592 |
| Dec. 15, 1971 | Japan | 46-102492 |

[52] U.S. Cl. .................................. 360/115, 360/125

[51] Int. Cl. .......................... G11b 5/12, G11b 5/26

[58] Field of Search .............. 179/100.2 C, 100.2 T; 340/174.1 F; 346/74 MC; 360/115, 125, 120, 122

[56] References Cited

UNITED STATES PATENTS

| | | | |
|---|---|---|---|
| 2,694,754 | 11/1954 | Connell | 179/100.2 C |
| 3,175,049 | 3/1965 | Gabor | 179/100.2 T |
| 3,435,440 | 3/1969 | Nallin | 179/100.2 C |
| 3,619,514 | 11/1971 | Barcard | 179/100.2 C |

*Primary Examiner*—Bernard Konick
*Assistant Examiner*—Robert S. Tupper
*Attorney, Agent, or Firm*—Wenderoth, Lind & Ponack

[57] ABSTRACT

In a magnetic recording head of the scanning type, a scanning head is disclosed. The scanning head conventionally includes an inner pole piece (1) having a recording gap (2) between a pair of poles (3, 3') thereof, a pair of outer pole pieces (6, 6') each having upper and lower ends, respective upper ends (198, 198') of which are arranged magnetically to couple with respective poles (3, 3') of the inner pole piece (1), at least one signal coil magnetically coupled with the inner pole piece, and a pair of scanning electromagnets (7, 7') which are magnetically coupled across both narrower sides of the lower ends (4) of the poles of inner pole piece (1) and both sides of lower ends of the outer pole pieces (6, 6'), respectively; said pair of scanning electromagnets (7, 7') applying magnetizing forces to the inner pole piece, said magnetizing forces being of one polarity at one end of the recording gap and decreasing in value to zero between both ends of said gap and then reversing in polarity and increasing in value toward the other end of said gap.

The improvement to the scanning head is that the inner pole piece (1) is made of plates having an anisotropic soft magnetic characteristic, wherein the direction of greater permeability is arranged to to beat right angle with the direction of the recording gap. By employing the anisotropic soft magnetic material in the pole piece, the head is able to attain recording of signals of higher frequencies.

6 Claims, 16 Drawing Figures

FLUX SCANNING TRANSDUCER HAVING ANISOTROPIC SOFT MAGNETIC INNER POLE PIECE

BACKGROUND OF THE INVENTION

This invention relates to a magnetic recording head capable of recording a signal of wide band width. This invention specially concerns a magnetic recording head of the scanning type, in which the recording point scans along a gap in a magnetic recording head so that a recorded track runs at a specified angle against the running direction of a recording tape.

Many improvements have been proposed concerning the scanning type magnetic recording head. One invention was proposed in the specification of the U.S. Pat. No. 2,955,169 for W. Stednitz. This prior art proposed:

a translating head for magnetic recording systems comprising, a plurality of magnetic head elements arranged in a row and being spaced apart in said row, a signal coil magnetically coupled to said head units, magnetizing means separate from said signal coil for applying magnetizing forces to the elements in said row, said magnetizing forces being of one polarity at one end of said row and decreasing in value to zero near the middle of said row and then reversing in polarity and increasing in value to the other end of said row, and second magnetizing means separate from said signal coil for applying to the head elements in said row magnetizing forces of uniform value and of the same polarity throughout said row, and means for varying the value of said second magnetizing forces.

Said head of the prior art has shortcomings in that assembling of the head is very troublesome because a plurality of, for example, more than one thousand magnetic head elements made of thin magnetic material must be stacked in a row, and also since each of the magnetic elements receives considerable interference from neighboring magnetic elements because the magnetic elements are piled upon one another over a considerable area causing a considerable magnetic reluctance inbetween. The former shortcoming causes high manufacturing cost, while the latter shortcoming deteriorates discrimination between the recordable zone and the remaining part on the recording gap, and hence deteriorates the high frequency characteristic.

SUMMARY OF THE INVENTION

The present invention provides an improved scanning-type magnetic recording head capable of recording the signal of wide band width. This invention further provides an improved scanning-type magnetic recording head exempt of the troublesome step of assembling a plurality of magnetic head elements into a row.

DETAILED DESCRIPTION OF THE INVENTION

Figures 1, 2, 3:
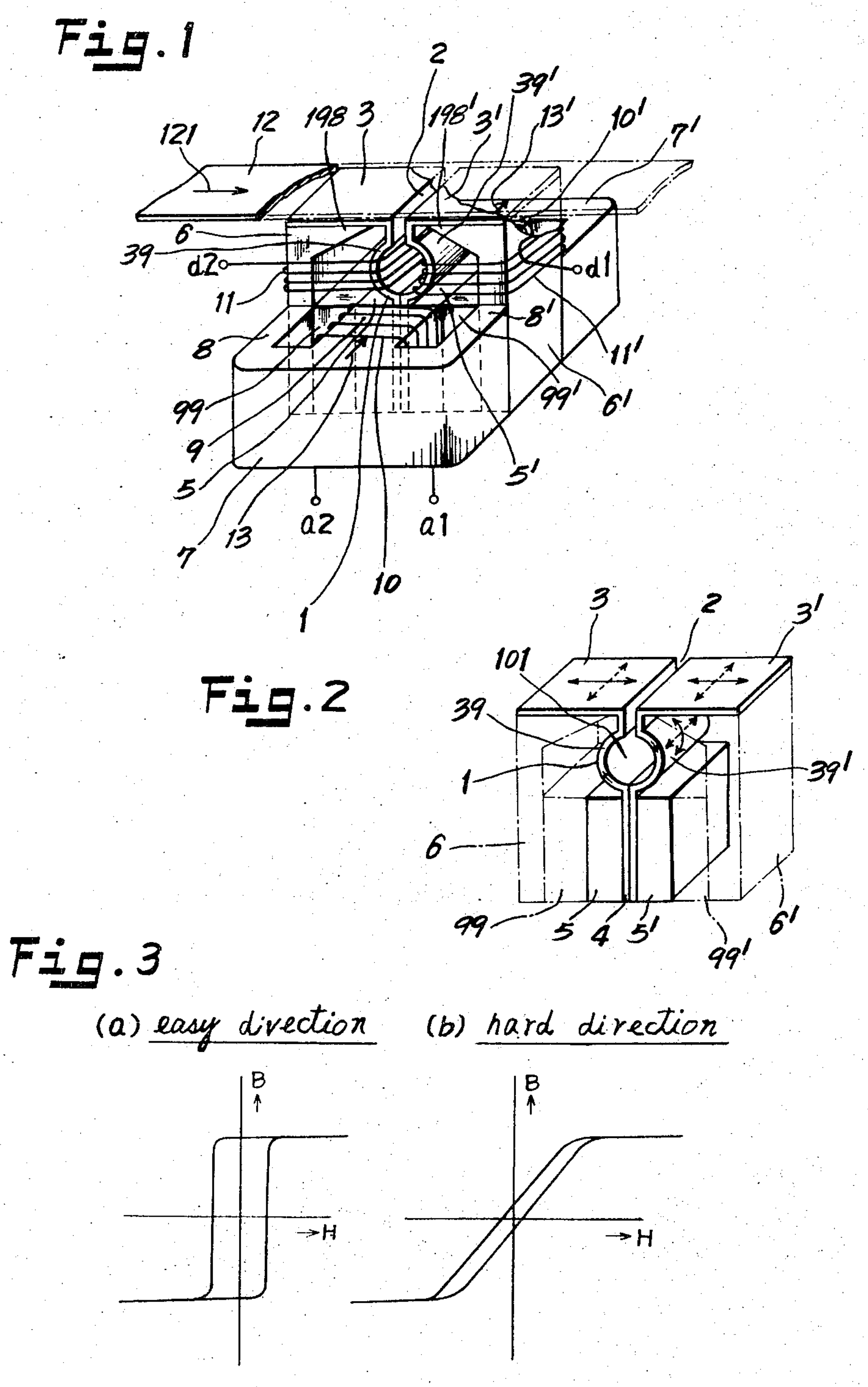
FIG. 1 is a fragmental perspective view of a recording head embodying the present invention.
FIG. 2 is a perspective view of a part of the recording head shown in FIG. 1, FIGS. 3*a* and *b* are graphs showing B–H curves, namely, curves of magnetic flux density vs. magnetic field intensity in easy and hard direction, respectively, of magnetization of the material to be used in an inner pole piece of the head embodying the present invention.

In FIG. 1, which is a fragmental perspective view of one example of the present invention, and in FIG. 2 which is a perspective view of a part of the head shown in FIG. 1, an inner pole piece 1 has a pair of contacting faces 3 and 3′, i.e., poles, forming a recording gap 2 therebetween. The contacting faces 3 and 3′ are the faces which contact the face of a magnetic recording medium, such as a magnetic recording tape 12. The inner pole piece 1 is made of anisotropic soft magnetic material, namely, plates of soft magnetic materials with anisotropic characteristic, and comprises central parts 39 and 39′ of the soft magnetic plates which form a coil space 101 inbetween, and comprises an elongated part 4 having the opposite ends of the soft magnetic plates and magnetically connected with the central parts 39 and 39′. A pair of blocks 5 and 5′ of constant permeability material, which is defined in this invention as a magnetic material having a ratio of maximum permeability to initial permeability of less than 2, are attached on both sides of the elongated part 4, respectively, so as to be connected magnetically. As said constant permeability material, for example, carbonyl iron or dust core can be employed. The abovementioned inner pole piece 1 forms a first closed magnetic circuit of "the elongated part 4—central part 39—contacting faces 3—3′—central part 39′—elongated part 4".

A pair of outer pole pieces 6 and 6′ are provided on each rear face of the contacting faces 3 and 3′, respectively, so as to be coupled thereto magnetically. The opposite end parts of the outer pole pieces 6 and 6′ are fixed to the blocks 5 and 5′ by means of non-magnetic material blocks 99 and 99′, respectively. An E-shaped scanning electromagnet 7 is provided in a manner such that the center leg 9 contacts one of shorter sides of the elongated part 4 and the constant permeability blocks 5 and 5′, and such that side legs 8 and 8′ contact shorter sides of the outer pole pieces 6 and 6′, respectively. A second E-shaped scanning electromagnet 7′ is also provided in a manner similar to the above but on the opposite sides of the blocks 5 and 5′ and the outer pole pieces 6 and 6'. The scanning electromagnets 7 and 7' have scanning coils 10 and 10', respectively, around their center legs.

A signal coil 11 is wound around the outer pole piece 6 and the central part 39 of the inner pole piece 6. Also, another signal coil 11' is wound around the outer pole piece 6' and the central part 39' of the innver pole piece 6'. This manner of winding is an important feature of the present invention. The coils 11 and 11' are connected in such a manner that magnetic fluxes produced by signal currents applied to the signal coils 11 and 11' form a magnetic flux passing through the central part 39', the recording gap 2, the central part 39 and back to the central part 39'.

The anisotropic character of the soft magnetic material of the inner pole piece 1 should be such that, referring to FIG. 2, the direction of smaller permeability, namely, the hard direction of magnetization shown by dotted arrows, is at a right angle to the running direction of the magnetic recording medium. In other words, the direction of larger permeability shown by the solid arrows is at a right angle to the recording gap 2. A characteristic of the anisotropic soft magnetic material is illustrated in FIG. 3*a* and FIG. 3*b*. FIG. 3*a* shows the B–H curve for the easy direction and FIG. 3*b* shows the B–H curve for the hard direction. As such anisotropic soft magnetic material, several materials can be employed as described later.

SCANNING OF THE RECORDING POINT

Figure 4:
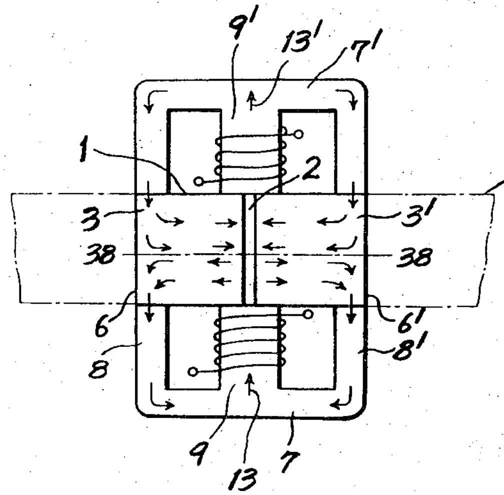
FIG. 4 is a schematic plan view of the head of FIG. 1 for illustration of the scanning action.

When currents of equal quantity are applied to the scanning coils 10 and 10' in such polarities that the scanning fluxes in the center legs are of is in the same direction as shown by arrows 13 and 13' in FIGS. 1 and 4, then, magnetizing forces, namely, fractions of the scanning fluxes, pass in the inner pole piece 1. The magnetizing force induced by the current in the scanning coil 10 and the other magnetizing force induced by the current in the scanning coil 10' are of the opposite direction to each other on the contacting face, i.e., poles 3 and 3', as shown in FIG. 4. As shown in FIG. 4, the magnetizing force is of one polarity at one end of the recording gap 2 and decreases in value to zero between both ends of said gap 2 in the longitudinal gap direction and then reverses polarity and increases in value toward the other end of the gap 2. Namely, the polarity of the flux changes at an invisible boundary line 38–38. The boundary line 38–38 crosses the gap 2 at the center of the length of the gap 2 when the currents of both coils 10 and 10' are equal. Scanning magnetic flux produced by the currents of the scanning coils 10 and 10' becomes zero in a very narrow region including the boundary line 38—38, while the region other than said narrow region has a considerable amount of magnetic flux from the scanning electromagnets 7 and 7'. On account of the zero flux in the narrow region, the soft magnetic material of the pole piece 1 in this region has permeability not affected by the scanning flux, while the soft magnetic material of the pole piece 1 in the region other than the narrow region is affected by the scanning magnetic flux so that the permeability of the material becomes very low.

With the above constitution, the gap 2 of the inner pole piece 1 has the magnetic flux produced by the currents in the signal coils 11 and 11', only at the cross point of the gap 2 with the boundary line 38—38. And the boundary line 38—38 moves upwards or downwards in FIG. 4 depending on the ratio between the currents in the scanning coils 10 and 10', and hence the point where the magnetic flux of signal exists moves along the length of the gap 2. Accordingly, when the magnetic tape 12 runs on this pole piece 1, the recording point can scan the tape 12.

Figure 5:
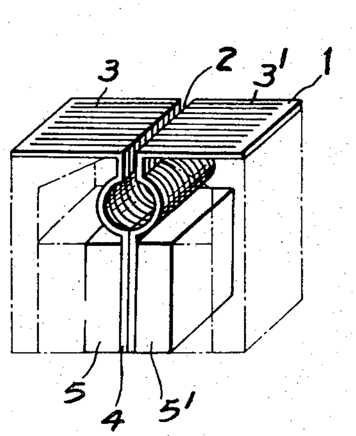
FIG. 5 is a perspective view of a part of another recording head embodying the present invention.
Figure 6:
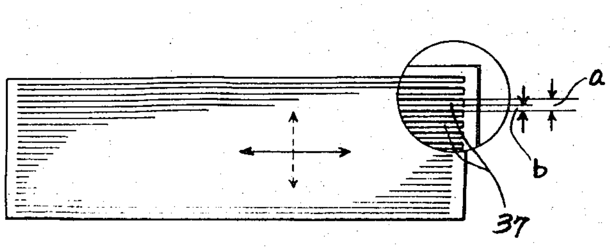
FIG. 6 is a partially enlarged plan view of a part of the magnetic plate used in the part shown in FIG. 5.

FIG. 5 shows a practical example of the inner pole piece to be employed to form the magnetic recording head shown in FIG. 1. In this example, the pole piece 1 is made of an anisotropic soft magnetic material illustrated in FIG. 6. In FIG. 6 the part indicated in the circle shows an enlarged view, as if seen through a magnifying glass. As shown in the circle, a thin plate of permalloy having a thickness of between several microns and about 10 microns, is chemically etched to make a plurality of fine parallel slits 37 extending along its length. Then the etched plate is bent and formed into the shape of the inner pole piece 1 shown in FIG. 2. In one example of the plate, pitches "*a*" between the slits 37 are about 20 microns and widths "*b*" of the narrow strips left between the slits are about 10 microns. When the abovementioned plate is magnetized in the direction perpendicular to the direction of the slits, the ratio of effective value in relative permeability $\mu e$ of this direction is as follows:

$$\mu e = 1 + b/a-b = a/a-b$$

Accordingly, the plate is less magnetized in the direction perpendicular to the direction of the slits and is easily magnetized in the direction of the slits. Such plate has an anisotropic magnetic characteristic with, the larger permeability, i.e., easy direction, in the direction of the slits and the smaller permeability, i.e., hard direction in the direction perpendicular to the slits, as shown by the solid arrows and the dotted arrows, respectively in FIG. 6. Since the easy and hard directions are made as mentioned above, the hard direction coincides with the direction of the gap, namely, the direction of scanning of the recording point. Therefore, the magnetic interference to the narrow region along the boundary line 38—38 from the neighboring regions, namely the interference in the scanning, direction can be minimized as a result of the hardness of magnetization, while the signal magnetic flux, which is in the direction of the easy direction can easily pass the pole piece, and produce sufficient recording flux at the gap 2.

In the example, the inner pole piece 1 is made by employing anisotropic magnetic material, in a manner such that the hard direction is perpendicular to the direction of the signal magnetic flux in the inner pole piece 1. Consequently, in the inner pole piece 1, passing of the fraction of the scanning magnetic flux in the direction parallel to the gap is very hard, thereby allowing the narrow region along the boundary line 38—38 to be free from magnetic saturation by the scanning magnetic flux. Accordingly, magnetic characteristic of the pole piece material at the recording point is not damaged by the scanning flux. If the scanning magnetic flux easily passes in the direction parallel to the gap the narrow region along the boundary line 38—38 is also saturated or almost saturated, and therefore the forming of recording point becomes impossible.

Figure 7:
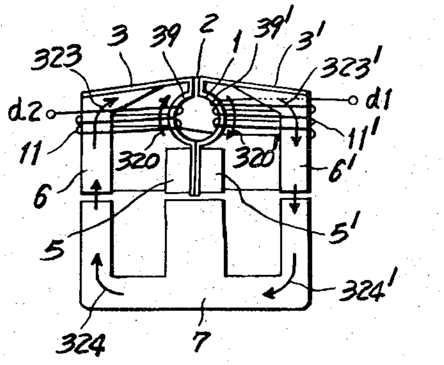
FIG. 7*a* is a schematic view illustrating the relation between a magnetic circuit and a signal coil of the present invention.
FIG. 7*b* is a schematic view illustrating the relation between a magnetic circuit and a signal coil of the scanning-type recording head of the prior art.
Figure 7:
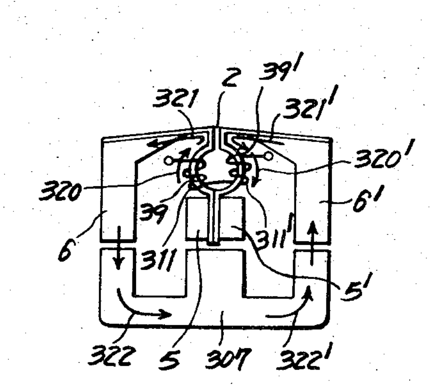

As already described referring to FIG. 1, the signal coil 11 is wound around the central part 39 of the inner pole piece 1 and the outer pole piece 6, and the signal coil 11' is wound around the central part 39' of the inner pole piece 1 and the outer pole piece 6'. Consequently, as illustrated in FIG. 7a, the signal flux induced in the central part 39 and in the outer pole piece 6 passes the gap 2 and go further to the central part 39' as well as to the outer pole piece 6'. Accordingly, almost all signal fluxes effectively pass the gap 2.

On the contrary, in the conventional signal coil, for instance, U.S. Patent specification No. 2,955,169, as illustrated in FIG. 7b, the signal coils 311 and 311' were wound only around the central parts 39 and 39', respectively. Accordingly, a considerable part of the signal flux in the central parts 39 and 39' pass through the outer pole pieces 6 and 6'. That is, the outer pole pieces 6 and 6' function as undesirable shunting paths for the signal flux. Accordingly in the magnetic head of the prior art only a small part of the signal flux has been utilized in the gap, and hence, the effective recording signal flux has been low. Such shortcoming of the prior art has been obviated in the present invention, by arranging the signal coils 11 and 11' in the aforementioned novel way, and the recording signal flux at the gap 2 has been greatly improved.

Figure 8:
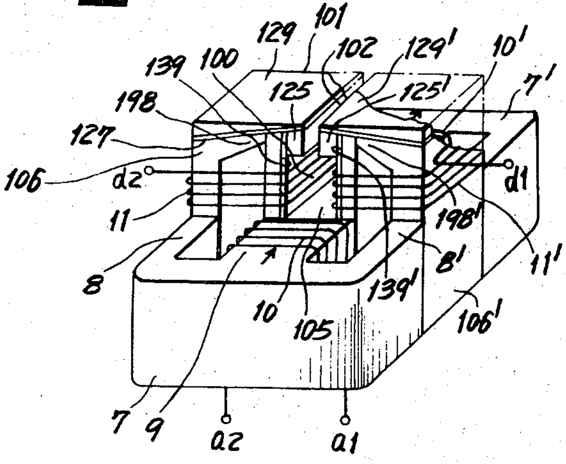
FIG. 8 is a fragmental perspective view of another recording head embodying the present invention.
Figure 9:
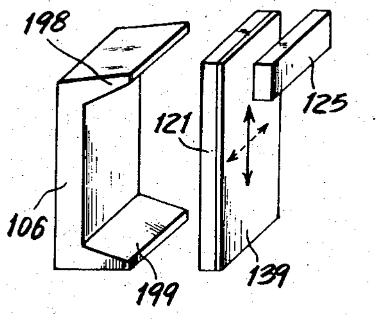
FIG. 9*a* and FIG. 9*b* are exploded perspective views and FIG. 9*c* is a perspective view illustrating various steps of making of the head shown in FIG. 8.
Figure 9:
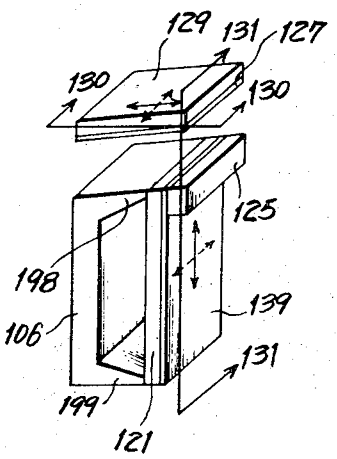
Figure 9:
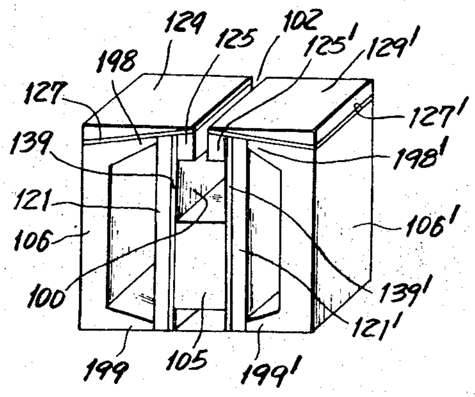

FIG. 8 shows another practical example of a magnetic recording head, and FIG. 9a to FIG. 9c show the steps of making the inner pole piece 101 and the outer pole pieces 6, 6' of the magnetic recording head of FIG. 8. In this example, biasing magnets 7 and 7' are constituted similarly to those of FIG. 1. The inner pole piece 101 consists of a pair of poles, i.e., contacting plates 129 and 129' and a pair of vertically elongated plates 121 and 121'. These plates consist of non-magnetic plates 129, 129', 121 and 121', for instance, glass plates, and of layers of material 127, 127', 139 and 139' having anisotropic soft magnetic characteristic. The easy and hard directions, namely, large and small permeability directions are selected, as shown in FIG. 9b by solid and dotted arrows. That is, the hard directions are parallel to the recording gap 102 of the inner pole piece 101, and the easy directions are perpendicular to the recording gap 102. The anisotropic soft magnetic layers are formed by vacuum-depositing or plating a soft magnetic material, for instance, permalloy, in a static magnetic field.

In making the assembly of the inner pole piece and the outer pole pieces, first, a non-magnetic reinforcing block 125, such as a block of glass as shown in FIG. 9a, is bonded to the magnetic layer 139 coated on the non-magnetic plate 121. Then the non-magnetic plate 121 is bonded to both end tips of the upper and lower legs 198 and 199 of the outer pole piece 106. The upper faces of the upper legs 198 and 198' of the outer pole pieces 106 and 106', respectively, are formed slightly sloped, so that the tip ends of the upper legs 198 and 198' are higher than the outer sides thereof. Then after "lapping" the upper face of the leg 198 and the upper ends of the plate 121 and the block 125 continuously as shown in FIG. 9b, a contacting plate 129 is bonded onto the continuous upper face of the upper leg 198 and to the upper face of the block 125, with its magnetic layer 127 contacting said continuous upper faces. The plate is also magnetically to coupled to the soft magnetic layer 139. Next, the non-magnetic plate 129 is "lapped" up to a tape-contacting plane indicated by lines 130—130 in FIG. 9b, so that the center side, namely, the side over the reinforcing block 125, of the magnetic layer 127 is exposed in a very narrow width to form a pole. Then, the abovementioned intermediate structure, which is a left half intermediate structure in the Figure, is lapped along the vertical plane indicated by 131—131 lines in FIG. 9b. A right-half intermediate is also made symmetric to the abovementioned left-half intermediate member in relation to the plane 131—131. Then the right and left halves are bonded together so as to form a specified recording gap 102, and a constant permeability block 105 is provided to contact both sides thereof with vertical anisotropic soft magnetic layers 139 and 139'. Thus a coil space 100 is formed, being defined by the lower faces of the non-magnetic blocks 125 and 125', the soft magnetic layers 139 and 139' and the upper face of the constant permeability block 105. The lower face of the block 105 is intentionally raised slightly from the bottom level of the lower legs 99 and 99' in order to avoid undesirable magnetic coupling between the legs 99, 99' and the low-extended part of the vertical soft magnetic layers 139, 139'. The abovementioned inner pole piece 101 forms a closed magnetic circuit of "the constant permeability block 105—magnetic plate 139—magnetic layers 127–127'—magnetic plate 139'—constant permeability block 105." Then a signal coil 11 is wound around central part of the soft magnetic layer 139 and the outer pole piece 106, and another signal coil 11' is wound around the soft magnetic layer 139' and the outer pole piece 106', and a pair of the scanning electromagnets 7 and 7' are coupled across both narrower sides of the constant permeability block 105 and the lower ends of the soft magnetic plates (121, 121') and both sides of the lower ends of the outer pole pieces (6, 6').

The head made in the abovementioned steps has the same advantages as those described in connection with the discussion of in FIG. 1. Moreover, sine the anisotropic soft magnetic layers are worked or lapped together with non-magnetic plates coated with the layers, neither magnetic strain nor mechanical strain is given to the anisotropic soft magnetic layers, and therefore, the anisotropic characteristic functions well.

Figure 10:
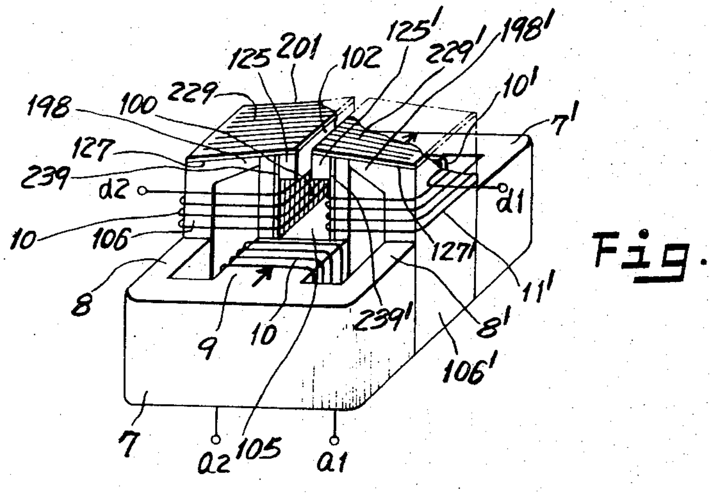
FIG. 10 is a fragmental perspective view of another recording head embodying the present invention.
Figure 11:
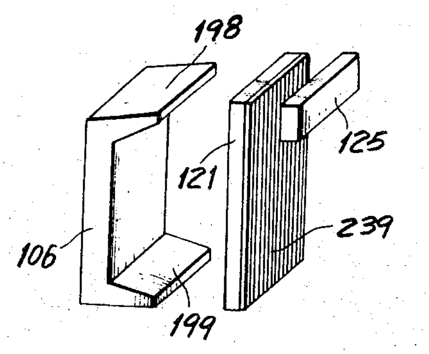
FIG. 11*a* and FIG. 11*b* are exploded perspective views and FIG. 11*c* is a perspective view illustrating various steps of making of the head shown in FIG. 10.
Figure 11:
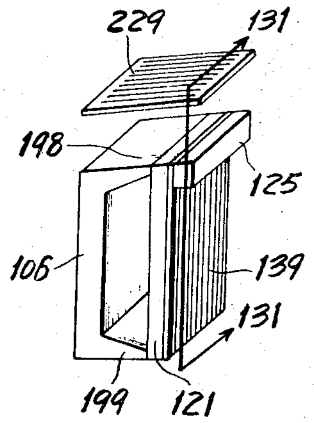
Figure 11:
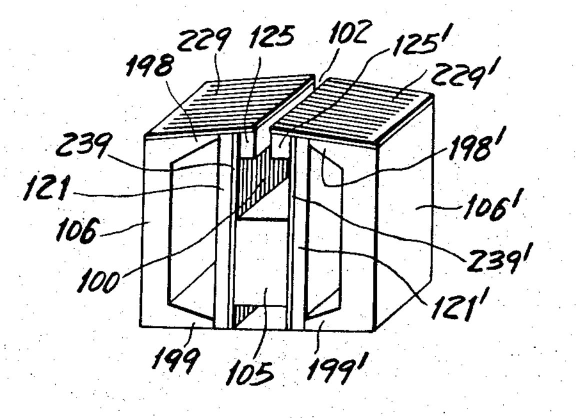

FIG. 10 shows another practical example of the magnetic recording head, and FIGS. 11a to 11c shows the steps of making an inner pole piece 101 and outer pole pieces 6, 6' of the magnetic recording head of FIG. 10. In this example, scanning electromagnets 7 and 7' are constituted similarly to those of FIG. 1. An inner pole piece consists of contacting plates 229 and 229' and a pair of elongated vertical plates 121 and 121'. The contacting plates are made of a material having anisotropic soft magnetic characteristics. The elongated plates consist of non-magnetic plates 121 and 121', for instance, glass plates, and of anisotropic soft magnetic material layers 239 and 239'. In said anisotropic soft magnetic material plates, the hard directions are parallel to the recording gap 102 of the inner pole piece 101, and the easy directions, i.e., the direction of the slits of the plates, are perpendicular to the recording gap 102. The anisotropic soft magnetic plates of this example are of the same material as used in the inner pole piece 1 of the example shown in FIG. 5; the plates are the same as described in reference to FIG. 6.

In making the assembly of the inner pole piece and the outer pole pieces, the soft magnetic plate 239 with a plurality of fine parallel slits are bonded onto one face of the non-magnetic plate 121 of, for instance, glass. Non-magnetic block 125, which may be formed of glass and shown in FIG. 11a is bonded onto the magnetic layer 239. Then the non-magnetic plate 121 is bonded to both end tips of the upper and lower legs 198 and 199 of the outer pole piece 106. The upper faces of the upper legs 198 and 198' of the outer pole pieces 106 and 106', respectively, are formed very slightly sloped, so that tip ends of the upper legs 198 and 198' are higher than the outer sides thereof. Then, after lapping the upper face of the leg 198 and the upper ends of the plate 121 and the block 125 as shown in FIG. 11*b*, a contacting plate 229 is bonded to the upper face of the upper leg 198 in such a manner that teeth and slits of the contacting plate 229 meet teeth and slits of the soft magnetic plate 239, thereby magnetically coupling the contacting plate 229 and the soft magnetic plate 239 to each other. Next, the left half intermediate member made as above is lapped along the vertical plane indicated by 131—131 lines in FIG. 11*b*. A right-half intermediate member is also made similarly to the above-mentioned left-half intermediate member. Then, the right and left halves are bonded to each other so as to form a specified recording gap 102, and a constant permeability block 105 is provided to contact both sides thereof to vertical anisotropic soft magnetic plates 239 and 239'. In said bonding of the right and left halves, at the gap 102, teeth and slits of both poles are arranged to oppose each other. Thus a coil space 100 is formed, being defined by the lower faces of the non-magnetic blocks 125 and 125', the soft magnetic plates 239 and 239' and the upper face of the constant permeability block 105. The lower face of the block 105 is raised slightly from the bottom level of the lower legs 99 and 99' in order to avoid undesirable magnetic coupling between the legs 99, 99' and the low-extended part of the vertical soft magnetic layers 239, 239'. The abovementioned inner pole piece 201 form a closed magnetic circuit of "the constant permeability block 105—magnetic plate 239—magnetic plates 229–229'—magnetic plate 239'—constant permeability block 105." Then, a signal coil 11 is wound around the soft magnetic layer 239 and the outer pole piece 106, and another signal coil 11' is wound around central part of the soft magnetic layer 239' and the outer pole piece 106', and a pair of scanning electromagnets 7 and 7' are coupled across both narrower sides of the constant permeability block 105 and the lower ends of the soft magnetic plates (121, 121') and both sides of the lower ends of the outer pole pieces (6, 6' ).

The head made in abovementioned steps has the same advantage with those described above in the discussion of FIG. 1. Moreover, since soft magnetic plates with fine slits are worked or lapped together with the non-magnetic plates 121, 121' or non-magnetic reinforcing blocks 125, 125', the fine structure of the soft magnetic layers can be well preserved during the working or lapping, and therefore, features based on the anisotropic characteristic are well attained.

As described in the various examples, the heads of the present invention attain sufficient discrimination between recordable zone and the remaining parts on the recording gap, and hence attain recording of signals of higher frequencies.

What is claimed is:

1. A magnetic scanning transducer comprising an inner pole piece (1) comprised of a pair of poles (3, 3') with first opposed ends forming a recording gap, a pair of outer pole pieces (6, 6'), ends (198, 198') of which magnetically couple with the respective poles (3, 3') of said inner pole piece (1), at least one signal coil magnetically coupled with said inner pole piece, a pair of scanning electromagnets (7, 7'), magnetically coupled across both sides of the other ends (4) of said poles of said inner pole piece (1) and both sides of the outer ends of said outer pole pieces (6, 6'), respectively, said pair of scanning electromagnets (7, 7') being provided with scanning coils (10, 10') which are energized for applying magnetizing forces to said inner pole piece, said magnetizing forces being of one polarity at one end of the recording gap and decreasing in value to zero between both ends of said gap and then reversing in polarity and increasing in value toward the other end of said gap, characterized in that the inner pole piece (1) is made of at least one plate of material having anisotropic soft magnetic characteristics, wherein the direction of greater permeability is at right angles with the axis of the recording gap and wherein said signal coil (11) is wound around the outer pole piece (6) and a central part (39) between said first end (3) and the other end (4) of said inner pole piece (1).

2. The magnetic recording head of claim 1, wherein the material having anisotropic soft magnetic characteristic is a metal of soft magnetic characteristic having a plurality of fine parallel slits, the direction of the slits being in the direction of greater permeability.

3. The magnetic recording head of claim 1, wherein the plate of material having anisotropic soft magnetic characteristic is a non-magnetic plate, one face of which has a coating of a material of anisotropic soft magnetic characteristic.

4. The magnetic recording head of claim 3, wherein the non-magnetic plate is a glass plate and the coating is a metal of soft magnetic characteristic with a plurality of fine slits at right angles to the axis of said recording gap (2).

5. The magnetic recording head of claim 3, wherein the non-magnetic plate is a glass plate and the coating is a layer of vacuum-deposited permalloy, the layer having anistropic characteristic produced by a deposition under magnetic field.

6. The magnetic recording head of claim 3, wherein the inner pole piece (1) comprises a pair of poles (3, 3') opposing each other across the recording gap 102, a pair of magnetic plates (139, 139'), respective first ends of which contact and are magnetically coupled to the respective rear faces of the pole pieces (3, 3'), and a constant permeability block (105) magnetically coupled to said magnetic plates (139, 139') and to the scanning electromagnet (7, 7'), the constant permeability block being of material having a ratio of maximum permeability to initial permeability of less than 2.

* * * * *